No. 773,614.

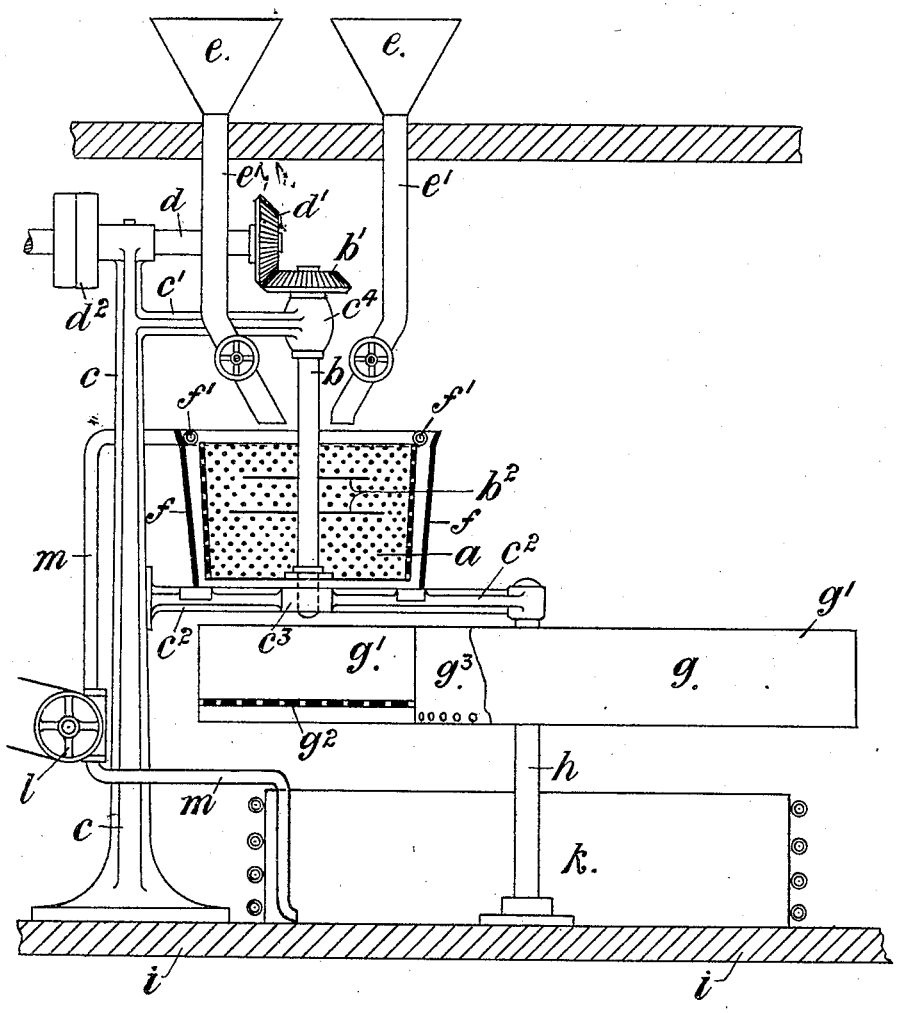

Patented November 1, 1904.

UNITED STATES PATENT OFFICE.

JAMES WESTAWAY, OF LIVERPOOL, ENGLAND.

METHOD OF PRODUCING GRANULATED AND SOLIDIFIED FATTY SUBSTANCES.

SPECIFICATION forming part of Letters Patent No. 773,614, dated November 1, 1904.

Application filed July 22, 1904. Serial No. 217,720. (No specimens.)

*To all whom it may concern:*

Be it known that I, JAMES WESTAWAY, a subject of the King of England, and a resident of Liverpool, in the county of Lancaster, England, have invented certain new and useful Improvements in the Production of Granulated and Solidified Fatty Substances, of which the following is a specification.

This invention has reference to the manufacture of granulated beef-suet and other like fatty substances.

According to this invention the granulation and solidification of fat or like substances is effected by throwing the fat in streams by centrifuging it in a suitable centrifugal machine and cooling and collecting the flying particles by introducing in the path of their flight a stream of cold fluid. The suet or other like material to be granulated having been melted is caused to flow from its container into a circular vessel of the centrifuging-machine, having its axis vertically disposed and formed of perforated sheet metal or wire-gauze or of perforated metal lined with wire-gauze or the like, it being revolved at a high rate of speed. The revolving perforated vessel is disposed and works within a tubular casing surrounding the said vessel and having at its upper edge a perforated water-pipe from which a stream of cooled fluid—say water—flows into and through the space between the tubular casing and the exterior of the revolving vessel. This stream of water receives the flying stream of granules of hot fat and cools and solidifies them and carries them away.

The invention will be further described with reference to the accompanying drawing, which is an elevation, partly in section, showing one form of apparatus for carrying it out.

$a$ is the vessel, having walls of perforated sheet metal or wire-gauze or of perforated metal or wire lined with wire-gauze or the like. The vessel is carried by a vertical spindle $b$, passing up through the center thereof and mounted in suitable bearings $c^4$ in the overhanging head $c'$ of the standard $c$ and in the step-bearing $c^3$, carried by the arm or bracket $c^2$, extending from the standard $c$. The upper end of the spindle $b$ is geared by suitable wheels $b'$ and $d'$ with the shaft $d$, which is driven by any suitable power through the drum $d^2$.

$e$ and $e'$ are respectively hoppers and tubes for conducting the melted fat into the vessel $a$.

If desired, one or more circular disks $b^2$ may be mounted on that part of the spindle which is within the vessel $a$.

Fixed on the arm or bracket $c^2$ and surrounding the vessel $a$ at a short distance therefrom is a tubular casing $f$, the upper edge of which is formed to receive a perforated pipe $f'$, from which when the apparatus is in use a constant supply of cold water or other suitable cold fluid flows and passes in a stream down through the space between the tubular casing $f$ and the exterior of the vessel $a$ and through the bottom of the tubular casing $f$.

Below the vessel $a$ and tubular casing $f$ is a horizontal frame $g$, carried by a vertical spindle $h$, mounted in bearings carried by the arm or bracket $c^2$ and the floor $i$, and around the outer edge of the upper face of the horizontal circular frame $g$ are arranged perforated trays $g'$, each of which is slightly larger than the bottom of the tubular casing $f$. These trays are provided with perforated bottoms $g^2$, and the inner wall of each tray is perforated below the false bottom to allow of the passage of liquid from the interior of the trays into the space $g^3$ in the center of the frame $g$, whence such liquid escapes through suitable openings and may, if desired, be received into a tank $k$, arranged below the frame $g$ and may there be cooled and by means of the pump $l$ and pipe $m$ again supplied to the perforated pipe $f'$. The perforated bottoms $g^2$ may constitute the bottoms of trays to fit into the trays $g'$, so that the former trays as they become charged with solidified fat may be removed and empty trays substituted therefor.

The action of the apparatus above described is as follows: The melted fat is allowed to run from the melting-pan into the vessel $a$, which is revolved at a high speed, whereby the fat is by centrifugal action thrown out through the perforations or openings in the walls of said vessel $a$ in streams of granules into the space between the latter and the tubular casing $f$, where it comes into contact with the stream of cold liquid passing down through such space from the pipe $f'$, by which it is cooled and solidified, and is then carried by the liquid into and deposited in the tray $g'$ beneath the casing.

Having now particularly described my invention, what I claim as new, and desire to secure by Letters Patent, is—

The herein-described method of manufacturing granulated and solidified fatty matter which consists in melting a fatty substance, throwing it horizontally by centrifugal action, and subjecting the flying granules to a stream of cooling fluid to cool and collect the same, substantially as described.

In witness whereof I have hereunto set my hand in presence of two witnesses.

JAMES WESTAWAY.

Witnesses:
L. GOODALL,
G. IKE.